United States Patent

Krause

[15] 3,641,363

[45] Feb. 8, 1972

[54] SHIFT REGISTER

[72] Inventor: Gerhard Krause, Munich, Germany

[73] Assignee: Fernseh GmbH, Darmstadt, Germany

[22] Filed: Mar. 26, 1970

[21] Appl. No.: 22,884

[30] Foreign Application Priority Data

Mar. 27, 1969 Germany ......................P 19 15 700.7

[52] U.S. Cl. ..............................307/221, 307/280, 307/281, 307/300, 307/319

[51] Int. Cl. ...............G11c 19/00, H03k 23/00, H03k 23/14

[58] Field of Search..................307/221, 280, 281, 300, 319

[56] References Cited

UNITED STATES PATENTS

| | | | |
|---|---|---|---|
| 3,001,087 | 9/1961 | Harloff | 307/281 X |
| 2,991,374 | 7/1961 | Miranda et al. | 307/300 X |
| 3,450,967 | 6/1969 | Tolutis | 307/221 X |
| 3,497,718 | 2/1970 | Ruoff | 307/221 |

*Primary Examiner*—John Zazworsky
*Attorney*—Littlepage, Quaintance, Wray & Aisenberg

[57] ABSTRACT

Shift registers using the charge-storage effect in individual semiconductors as data stores, including means for applying alternating signals to step the data forward.

9 Claims, 3 Drawing Figures

Inventor:
Gerhard Krause by Littlepage, Quaintance, Wray & Aisenberg
Attorneys

Inventor:
Gerhard Krause by Littlepage, Quaintance, Wray & Aisenberg
Attorneys

SHIFT REGISTER

BACKGROUND OF THE INVENTION

1. Field of the Invention

The invention relates to a shift register.

2. Description of the Prior Art

Shift registers are components which are frequently used in data processing, and serve to delay digital signals or to distribute them among various channels. Shift registers comprise a number of stores which are interconnected in such a manner that the data contained therein can be stepped from one store to the next succeeding store in response to an initiating control signal, the result being that a new piece of data is delivered to the first store and a piece of data is delivered up by the last store.

Shift registers are already known in which the stores are bistable switching stages, or in which the storage is accomplished by capacitor charges. Furthermore, switching arrangements are necessary, whereby the data is stepped from one store into the next store. Intermediate stores are necessary in order that all the data elements can be stepped simultaneously. These known shift register types are often quite expensive.

SUMMARY OF THE INVENTION

The purpose of the present invention is to provide a shift register which is inexpensive and is particularly suited to integrated circuit construction.

The invention comprises a series of solid-state storage elements which, after a change in the polarity of an applied voltage, are ready to admit a quantity of charge dependent upon the magnitude of a current available prior to the change of polarity. The solid-state storage elements are alternately supplied with opposite-phased alternating voltages. Those respective storage elements which are supplied in the blocking direction by one half-wave of the alternating voltage are electrically connected to the following storage elements.

In the disclosed embodiments of the invention, the solid-state storage elements are diodes or the diode paths of transistors. These circuit arrangements are inexpensive. In the simplest of these circuit arrangements, the individual stages consist of a small number of blocking-layer junctions.

BRIEF DESCRIPTION OF THE DRAWINGS

The invention will now be explained in more detail with reference to the accompanying drawings.

DESCRIPTION OF THE PREFERRED EMBODIMENTS

Figure 1:
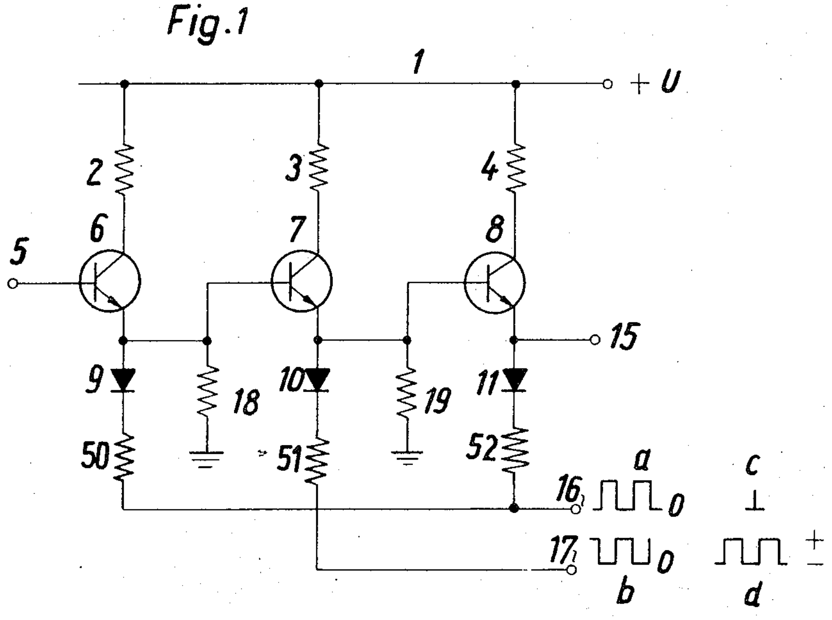
FIG. 1 is a schematic diagram of a circuit according to the invention, wherein the storage elements are diodes.

FIG. 1 shows three stages of a shift register according to the invention, wherein respective stages comprise respective transistors 6, 7 and 8 and respective diodes 9, 10 and 11. The resistances 2, 3, 4, 18 and 19 have a subordinate significance for the function of the circuit arrangement and may under certain conditions be omitted.

The digital signal which is to be delayed is delivered to the circuit arrangement at a point 5, while the clock pulses for the shift register are fed in at 16 and 17. The pulses are such as is represented, for example, by the waveforms *a* and *b*. The operating voltage for the circuit arrangement is fed in through line 1. The digital signals at the point 5 are capable of alternately assuming two switching conditions, for example, ground and positive potential.

If now, during a first time interval, the control voltage of terminal 16 is at ground potential, then current will flow through the transistor 6 if the digital signals at 5 have a positive potential. This current flows likewise through the diode 9. During the subsequent time interval, the the point 16 is at positive potential. Thereby both the diode 9 and the transistor 6 are blocked. Due, however, to the fact that the diode 9 possesses an exceptional charge storage effect (charge inertia), a quantity of charge will flow through the blocked diode 9. This quantity of charge is substantially proportional to the current available before the change of polarity at point 16. However, this proportionality is irrelevant for digital applications. The only effect which is used is that, when there is positive potential at the input side, a current has passed. This current, in the following half-wave of the control voltage at the point 16, releases a current surge through the diode 9. The discharge current of the diode 9 flows through the base-emitter path of the transistor 7, whose emitter at this time is connected to ground potential through diode 10 and terminal 17. The current is amplified by the transistor 7, thereby causing the first-mentioned information (the positive potential at the input 5) to exist on the diode 10. During the next time-interval set by the control voltages at 16 and 17, the next value is interrogated at the input 5 and is brought into the diode 9, and during the same time the data of the diode 10 is transferred into the diode 11. It is possible to connect any desired number of stages in series, the diodes being connected alternately to the switching points 16 and 17.

According to waveforms *a* and *b*, the control of the diodes is effected by means of undulating pulses phase-displaced by 180°. It is possible to achieve similar success by the use of sinusoidal voltages. Since the essential point is that the bottom points of the individual stages shall be supplied with rectangular or sinusoidal control voltages, it is also possible to connect each second diode to a constant potential; for example earth potential, as symbolically represented at *a*, and to supply the other diodes with a voltage which fluctuates about this potential.

The resistances 2, 3 and 4 are provided solely for limiting the currents through the diodes and transistors. However, if suitable choice is made of the characteristics of the diodes and transistors, the resistances may be omitted. For the purpose of current limitation it is possible, instead of using the resistances 2, 3 and 4, to interpose resistances in the leads from the control voltages to the diodes. For example, resistances 50, 51 and 52 can be inserted when resistance is desired or omitted when straight-through conductance is needed. Even when, prior to the change of polarity of the alternating voltage applied to the diode, no current flows through the diode, nevertheless there will be a small current surge after the change of polarity. This surge is due to the capacitance of the diode. If this current surge is too large, so that the following transistor becomes conductive, the bases of the transistors 7 and 8 can be connected through the resistances 18 and 19 to ground potential or to a negative voltage source.

Figure 2:
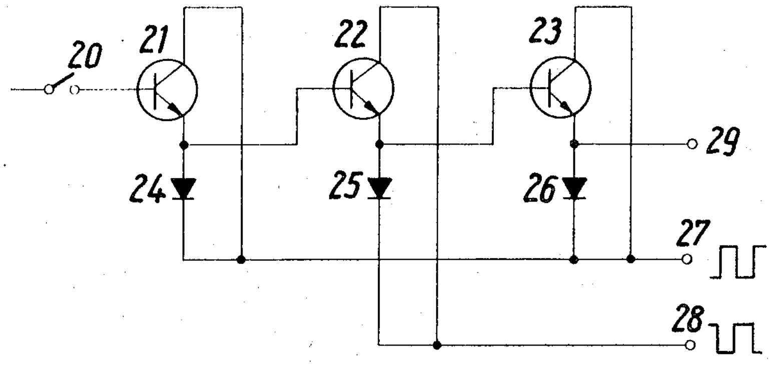
FIG. 2 is a schematic diagram of a circuit according to the invention wherein the base-emitter paths of the transistors assume the storage function.

FIG. 2 shows a section of a shift register, wherein the base-emitter paths of transistors 21, 22 and 23 are adapted for the storage of charge. The digital signals are delivered at the point 20 and can be taken off in the delayed condition at point 29 as well as at the emitters of the other transistors. The diodes 24, 25 and 26 provide a negligible charge-storage effect. For explaining the function of the circuit arrangement according to FIG. 2, it will be convenient to start from a time instant at which the voltage at the terminal 27 is negative and that at the terminal 28 is positive. Let the electronic switch 20 be closed when the voltage at the circuit point 27 is also negative. For determining the arrangement for the digital signals which are to be delivered to the switch 20, positive and negative voltage conditions will be assumed which substantially correspond to the two extreme values of the alternating voltage applied at points 27 and 28. At the above-named time instant, there will then be a negative potential both at the cathode of the diodes 24 and at the collector of the transistor 21, while the corresponding points of the following elements of the shift register are raised to positive potential. From this, it follows that the transistor 22 is nonconducting and that no current caused by the pulses flows through the transistor 21 because both the collector and the emitter of the transistor 21 are at negative potential. However, because at this time instant the switch 20 is closed, a current flows through the base-emitter path of the transistor 21 and the diode 24 if the digital signals, which are delivered through the switch 20, are positive. From this it follows that for positive signals on the transistor 21 a charge is stored, while for negative signals no charge is stored.

During the following half-wave of the control voltage at points 27 and 28, the element of the shift register comprising transistor 21 and diode 24 is raised to positive potential, while the following element receives negative potential. From this results a current which, considered in the flow direction of the electrons, proceeds from the terminal 28 through the diode 25, through the base-emitter path of the transistor 22 through the transistor 21 to the terminal 27. This current persists until the stored charge in the base-emitter path of the transistor 21 is dispersed, and flows only if, in the preceding half-wave of the control voltage, a current flowed through the base of the transistor 21. In this way the data is stepped through one element of the shift register. At the next half-wave, the data which is stored in transistor 22 is transferred into transistor 23, and through the switch 20, the next data element is interrogated.

In this case also it is possible to take off output signals at each storage element. It is also possible, as with the circuit arrangement in FIG. 1, to interpose resistances at which voltage drops occur, which can be employed as output voltages.

Figure 3:
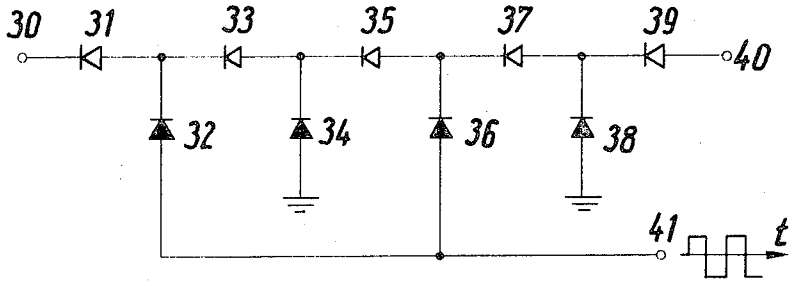
FIG. 3 is a schematic diagram of a circuit wherein simply diodes are employed.

In the circuit arrangements according to FIG. 1 and 2, an amplification is caused within each element by the use of transistors, so that the signals which are conducted through the shift register constantly exhibit an optimum amplitude. Where it is possible to do without such amplification, it is possible to employ advantageously the circuit arrangement according to FIG. 3. In the circuit arrangement according to FIG. 3, the storage elements are diodes 32, 34, 36 and 38 which have a marked charge storage effect, while the diodes 31, 33, 35, 37 and 39 exhibit a negligible charge inertia as compared with the first-mentioned diodes. Similarly, as in the case of FIGS. 1 and 2, FIG. 3 represents merely a section of a more extended shift register. The binary signals are delivered in at point 30 while they may be taken off again in delayed form at point 40. The control (clock) pulses arrive at point 41 in the circuit arrangement and are delivered to the diodes 32 and 36. The function of the circuit arrangement according to FIG. 3 is extremely simple. At each polarity change of the control voltage at point 41, the data in a diode is transferred to the next diode. For reasons of symmetry, it is also possible to control the diodes 34 and 38 by an alternating voltage which is in opposite phase to that at the diodes 32 and 36.

In the circuit arrangement according to FIG. 3, no amplification takes place. Therefore, the level of the digital signals declines with the increasing number of elements in the shift register. If this level falls below a permissible value, then it is possible to add to the circuit conventional pulse formers, or shift registers, according to FIGS. 1 and 2.

Likewise it is possible to connect between the solid-state storage elements other active elements, for example, field-effect transistors.

What is claimed is:

1. A shift register comprising:

first and second control terminals, means to supply first and second relatively alternating periodic control voltages to the respective control terminals, a series of transistors each comprising a base-emitter path for forming said storage elements, an emitter of each transistor being connected to a base of the following transistor, a plurality of diodes, each diode being connected to an emitter of a corresponding transistor and the diodes being connected in space-sequential alternation to the first and second control terminals, the charge inertia of the diodes being small in relationship to that of the transistors, means for connecting the collector of each transistor to the terminal to which its emitter is indirectly connected through a diode, input means connected to a base of a first transistor in the series and an output connected to an emitter of a last transistor in the series.

2. The shift register of claim 1, wherein alternating rectangular wave voltage is applied to one control element and like voltage phase displaced 180° is applied to the other control terminal.

3. The shift register of claim 1 wherein alternating sinusoidal voltage is applied to one control terminal and like voltage phase displaced 180° is applied to the other control terminal.

4. A shift register comprising:

a first series of diodes having a short storage time series connected in uniform conductive direction, a free input terminal of the first diode forming a register input and a free output terminal of the last diode forming a register output, a second plurality of diodes having a relatively greater storage time and having respective like poles connected to the respective junction points of said first plurality of diodes, said second plurality of diodes having greater storage time, means for connecting the alternate other poles of said plurality of diodes, as counted from the input, respectively to first and second control terminals, and means for applying a constant potential to one of the control terminals, means for applying alternating voltage symmetrical with respect to the constant potential is connected to the other control terminal.

5. The shift register of claim 1 wherein a periodic rectangular wave voltage is applied to the other control terminal.

6. The shift register of claim 1 wherein a periodic sinusoidal voltage is applied to the other control terminal.

7. A shift register comprising:

a power source, first and second control terminals, means to supply first and second relatively alternating periodic control voltages to the respective control terminals, a plurality of diodes, each having first and second electrodes, each diode having a marked charge storage effect, and a series of transistors each transistor having a collector connected to the power source and having an emitter connected to a first electrode of a diode and connected to a base of a following transistor, an input connected to a base of a first transistor in the series, and an output connected to an emitter of a last transistor in the series, the second electrodes of alternate diodes being connected to the first control terminal, and the second electrodes of remaining diodes being connected to the second control terminal.

8. The shift register of claim 7 wherein the means to supply alternating voltage comprises means to supply sinusoidal voltage which is symmetrical to the constant potential to the other control terminal.

9. The shift register of claim 7 wherein the means to supply alternating voltage comprises means to supply rectangular wave voltage which is symmetrical to the constant potential to the other control terminal.

* * * * *

PO-1050
(5/69)

UNITED STATES PATENT OFFICE
CERTIFICATE OF CORRECTION

Patent No. 3,641, 363 Dated February 8, 1972

Inventor(s) Gerhard Krause

It is certified that error appears in the above-identified patent and that said Letters Patent are hereby corrected as shown below:

IN THE CLAIMS:

Claim 2, line 2, change "element" to --terminal--.

Signed and sealed this 27th day of June 1972.

(SEAL)
Attest:

EDWARD M.FLETCHER,JR.
Attesting Officer

ROBERT GOTTSCHALK
Commissioner of Patents